(12) United States Patent
Chang

(10) Patent No.: US 8,431,872 B2
(45) Date of Patent: Apr. 30, 2013

(54) COUNTERTOP COOKER

(76) Inventor: Peter Chang, San Diego, CA (US)

( * ) Notice: Subject to any disclaimer, the term of this patent is extended or adjusted under 35 U.S.C. 154(b) by 327 days.

(21) Appl. No.: 12/962,491

(22) Filed: Dec. 7, 2010

(65) Prior Publication Data
US 2011/0132894 A1    Jun. 9, 2011

Related U.S. Application Data

(60) Provisional application No. 61/267,286, filed on Dec. 7, 2009.

(51) Int. Cl.
*A47J 36/00* (2006.01)
*A47J 36/32* (2006.01)
*A47J 37/10* (2006.01)
*H05B 1/02* (2006.01)

(52) U.S. Cl.
USPC ............................ 219/441; 219/494; 99/333

(58) Field of Classification Search ................... None
See application file for complete search history.

(56) References Cited

U.S. PATENT DOCUMENTS

| | | | |
|---|---|---|---|
| 4,463,249 A * | 7/1984 | Narita et al. | 219/441 |
| 7,002,111 B2 * | 2/2006 | Bauer | 219/480 |
| 7,100,497 B2 * | 9/2006 | Shandross | 99/330 |

FOREIGN PATENT DOCUMENTS

JP          03030287 A   *  2/1991

* cited by examiner

*Primary Examiner* — Joseph M Pelham
(74) *Attorney, Agent, or Firm* — Donn K. Harms

(57) ABSTRACT

A countertop cooking device such as a slow cooker or rice cooker which operates to initially reach a heat within the cooking cavity sufficient for sauteeing or braising food. A microprocessor communicating with a temperature sensor monitors the cooking cavity in order to sense drops in temperature. When a sudden drop in temperature occurs due to the addition of liquid to the cooking cavity, the device is caused to drop to a lower cooking temperature appropriate for boiling, simmering, or maintaining food warmth.

18 Claims, 2 Drawing Sheets

COUNTERTOP COOKER

This application claims Priority to U.S. Provisional Application No. 61/267,286 filed Dec. 7, 2009 and which is hereby incorporated herein in its entirety by reference.

FIELD OF THE INVENTION

The disclosed device relates to an improved countertop food cooking device. More particularly, it relates to such a countertop cooking device, such as a slow cooker, or a rice cooking device, which operates to initially reach a heat within the cooking container to a temperature sufficient to saute or braise food deposited therein, while a microprocessor communicating with a temperature sensor, or other means for temperature determination, monitors the cooking cavity to sense any sudden drop in temperature caused by the addition of liquid while the device is at temperatures at or above 220 degrees Fahrenheit. Upon sensing the sudden drop in temperature within the cooking cavity, the device is caused to drop to a lower cooking temperature appropriate for boiling, simmering or maintaining warmth.

BACKGROUND OF THE INVENTION

The device and method herein described and disclosed, relate to countertop cooking devices such as rice cookers and slow cookers and similar electric cooking devices. For the sake of brevity, the terms "slow cooker" or "rice cooker" or "countertop cookers" are employed to describe popular terms for such devices.

However, the use of these terms should not be considered limiting in any fashion as the automatic lowering of heating element temperature to lower the cooking temperature in the cooker, herein disclosed, which is initiated upon sensing a sudden drop in cooking cavity temperature, can be employed with any such electric cooking device and such is anticipated.

Conventional rice cookers, which are functionally similar to slow cookers, have become ever more popular throughout the world. Conventional electric rice cookers and slow cookers have a power switch which also activates an automatic temperature sensing means which monitors the temperature of the inner cooking cavity or pot which is surrounded by a sidewall. This power switch connects an electric heating element to AC power to cook the rice or other food located within the cooking cavity.

In the conventional electric slow cooker or rice cooker, the cooker is turned on by the user using a switching means such as a mechanical or push button switch. Thereafter, heating elements of the cooker are automatically activated only to cause the temperature of the cooking cavity in the pot to rise to a predetermined temperature which is only sufficient for boiling the contents.

In a boiling sequence in conventional cookers, the mixture of rice and liquid within the cooking cavity rises in temperature only to a boiling point, using the heat from the heating element which is activated once the user switches the cooker to an "on" position. During the boiling sequence, the temperature of the cavity conventionally can rise suddenly once all of the liquid in the cooking cavity is exhausted and boiled-off during cooking. If the user cooks properly, a bit more water or liquid must be added to the mix once the rice is boiled. At this point, the cooker is manually switched to cause the heating element to lower the communicated heat, and thus the temperature, in the cooking cavity. It is thus important that the user or chef remember to lower the cooker temperature on manually switched models after adding a bit more water or liquid to the mix, to allow for a simmering period and maintaining the food warmth. A failure to lower heating element temperature and thus the cooking cavity temperature at this point in the process, can cause the rice to either re-boil and become less than tasteful, or to burn once all the water or liquid is exhausted. Similar problems are encountered if the cooker is used for risotto or Spanish rice and in cooking any recipe where an initial high temperature phase is followed by a low temperature simmering or warming phase of cooking.

Conventional countertop cookers configured as rice cookers and the like, generally maintain the cooking temperature in the internal cavity between a simmering temperature and a temperature just above boiling for the first sequence. In a second sequence, the cooking cavity temperature is lowered to just below a boiling temperature to allow for a simmering and a warming of the contents such as rice over a period of time. To avoid overheating or burning the cooking cavity contents, most such cookers simply maintain the upper limit of cooking temperature at just below a boiling point.

However, where meat or fish or fowl is desired as the initial food stock to be added to the resulting rice, such temperature-limited cookers can be very inconvenient. The temperature controls can restrict the temperature below a point where the chef can properly saute or stir-fry or sear the meat or fowl or fish, and cook it in the internal cavity for a combination with the subsequently added rice. This conventional temperature limitation at a low range can also limit the sauteing of rice for risotto or Spanish rice.

In countertop slow cookers, less adapted to rice cooking, which have a heating cavity with sufficient heating elements to reach a saute or frying temperature, this stir frying or sauteing of the first-deposited food can be accomplished. However, once the meat or fish or fowl or rice and oil are cooked by frying to a finished state, the user must remember to lower the cooking temperature for the long duration the device will require to steam, simmer, or slow cook rice with the cooked mixture in the cooking cavity of the cooker. Conventionally, once the meat or fowl or other food has been stir fried or sauteed or otherwise cooked at a necessary high temperature, additional liquid is added by the user to the cooked food in cooking cavity and frequently rice is also added. The mixture of liquid, rice, and the previously high-temperature cooked food is then allowed to simmer to properly cook the rice at the correct temperature and to enhance the taste.

However, to initiate this secondary cooking phase, it is most important for the cook to lower the cooking temperature to a simmering temperature when they finish cooking at high temperatures and when they add water or liquid or a secondary liquid supply such as broth. Because adding a portion of low temperature food and/or liquid to the high temperature mix initially slows the cooking process and the visual cues and sounds related thereto, the user can easily misconceive that all is well. However, there is a high possibility of burning the rice and contents of the cooking cavity during the secondary phase of cooking the mixture if the user assuming temperatures have lowered, walks away or fails to adjust the heating element temperature to yield a simmering phase.

It is this step of adding liquid, such as water or broth, when the sauteing or frying of food is finished, when a simmering phase is desired, where conventional rice cookers fail to adequately serve the user. Inexperienced users, seeing the food contents have ceased high temperature visual and audio cues, or may not read directions if available, may simply not know that it is imperative that the cooking temperature must be immediately lowered in the cooking cavity from the previous high temperature of frying, upon the addition of water or liquid. Even experienced cooks, being busy or distracted or absent minded, may simply forget they must manually lower the temperature radiated by the heating element of the cooker, to lower the cooking temperature in the cooking cavity immediately after they add the liquid to the sauteed rice or meat.

Consequently, it is a frequent and vexing shortcoming of conventional countertop cookers, such as slow cookers, rice cookers and other countertop cookers, which causes users to burn or overcook the food in the cooking cavity after it has been sauteed at high temperatures. This results in a burning or overcooking frequently because these users fail to lower the temperature of the heating element once the initial high heat cooking is finished. It is a simple but an easily-forgotten manual act for the cook to manually switch the cooker to lower the heat generated by the heating elements to thereby lower the cooking cavity temperature. This switching is conventionally manually-activated by the act of the user pushing a button or digital switch or knob, or the like, thereby causing the counter-top cooker to lower the heating element radiating temperature. This act thereby properly lowers the heat in the cooking cavity to simmering temperature for the duration of a simmering cycle.

Further, because of this common problem of users forgetting to manually change temperatures, many slow cookers, rice cookers, and other countertop cooking devices, have had their high temperature cooking ability eliminated by the manufacturer. While limiting the maximum temperature of slow cookers to boiling or below, prevents the problem of burning the contents at excessively high temperatures, these feature-lacking countertop cooker devices are solely designed to cook for long durations at low temperatures and therefor lack the ability to initially saute a mixture to be later included and blended with rice or other food.

As such, there exists an unmet need for a slow cooker or countertop cooker or other such cooking device, which is employable for cooking rice, risotto, or similar foods in a simmer mode, and which is configured to allow the cooker to reach sufficient temperatures in a high temperature phase to first saute a mixture of food deposited in the cooking cavity during the first high temperature mode. Such a device should however eliminate the risk that the user will forget to manually lower the cooking temperature once they finish their high temperature cooking of the initial food deposited. Such a device should not require or use a timer to effectuate the drop in temperature since cooking times vary widely. Such a device should simply sense when the user is done with high temperature cooking, and automatically switch to the required lower temperature once the mixture therein is finished sauteing and the user adds liquid for longer term simmering. Such a device should initiate this switching of the heating element from the higher temperature to this lower cooking temperature, at the point in time in the cooking process where the user subjectively determines high temperature cooking is done, and additional liquid is added by the user for the simmering period. Such a device, therefor, should alleviate the need for absent minded or uninformed users, to manually switch the cooker to a lower temperature, at the subjective and varying times it will be required, depending on what was cooked first at high temperatures.

In this respect, before explaining at least one embodiment of the slow cooker or rice cooking device herein in detail, it is to be understood that the invention is not limited in its application to the details of construction and to the arrangement of the components set forth in the following description or illustrated in the drawings nor the steps outlined in the specification. The disclosed rice cooker is capable of other embodiments and of being practiced and carried out in various ways as those skilled in the art will readily ascertain, once educated in the novel device and method of operation disclosed in this application.

Also, it is to be understood that the phraseology and terminology employed herein are for the purpose of description and should not be regarded as limiting in any manner. As such, those skilled in the art will appreciate that the conception upon which this disclosure is based may readily be utilized as a basis for designing other methods and systems for carrying out the several purposes of the automatic temperature switching cooker disclosed herein. It is important, therefore, that the claims be regarded as including such equivalent construction insofar as they do not depart from the spirit and scope of the present invention.

OBJECTS OF THE INVENTION

An object of this invention is the provision of a counter-top electric cooking device, slow cooker, or rice cooker and the like, which switches automatically, from a higher temperature such as a sauteing temperature, to a lower cooking temperature in the cooking cavity, no matter how long the user has determined the high temperature cooking phase should last.

An additional object of this invention is the provision of such a cooker which will initially allow an elevated temperature in the cooking cavity, to a temperature sufficient for sauteing or frying or stir frying, and for an infinitely variable time period solely determined by the user, and then automatically lower the temperature of the heating element, to maintain the cooking cavity in a simmering state and avoid burning the food therein.

These together with other objects and advantages of the disclosed counter top cooking device herein which will become subsequently apparent to those skilled in the art, reside in the details of the construction and method herein as more fully hereinafter described and claimed, reference being had to the accompanying drawings forming a part thereof, wherein like numerals refer to like parts throughout.

SUMMARY OF THE INVENTION

In accordance with a first mode of the disclosed countertop cooker or electric slow cooker, or rice cooker or the like, in the present invention, the cooker is provided with an electrical control means in a base, which allows the user to activate the heating element of the cooker to heat the operatively engaged pot. The electrical control then detects and maintains the inner cooking cavity above it, at a temperature substantially suited for stir frying, or sauteing rice, meat, fish, or fowl, or other food that is initially best cooked at high temperatures. The temperature control means may be a hand activated, electronic, or a manual control and will initiate and maintain the cooking cavity at a higher temperature such as for sauteing, for the entire duration of the user-determined time of the first phase of the cooking process. This length of this first duration is subjective, and is determined solely by the user and consequently a timer will not provide the function. The duration can vary widely, depending on the food being cooked at high temperature and the user doing so. Cessation of the high temperature cooking phase by the user, is solely determined by the user's addition of a quantity of fluid, or fluid and food, sufficient to cause a lowering of the cooking cavity temperature.

Once the food initially deposited in the first phase, has been sauteed or otherwise cooked at the higher required cooking temperature, and for the duration determined by the user as suitable to cook the contents, the device herein is configured with a temperature sensor for ascertaining a sudden drop in cooking cavity temperature. This sudden reduction or drop in temperature is caused by the user adding the noted liquid to the cavity once the user determines the first phase of cooking at a high temperature is finished. The addition of water or liquid and/or liquid and food, to the meat or fowl or fish or other food which was cooked at a high temperature, allows the rich flavor of the prior-cooked food from the high temperature phase, to impart a flavor to all of the mixed food in the cooking cavity during the longer simmering or lower temperature phase.

The user, once they determine by sight or smell or other subjective means that the variable duration of the first high temperature cooking cycle is over, by adding the water or liquid such as a broth to the mixture of high-temperature cooked food already in the cavity, thereby causes a sudden drop in temperature in the cooking cavity.

This lowering of cooking cavity temperature caused by addition of unheated liquid, provides rapid relative temperature reduction in a matter of seconds, which is sensed by a temperature probe in operative communication with the cooking cavity. The amount of time may be from 1 to 10 seconds depending on the temperature of the added unheated liquid or food. Upon sensing this sudden and large temperature reduction, caused by the user's action of adding fluid, the sensor reacts by sending an electronic signal to a microprocessor or other electrical control for the electrical power communicated to one or a plurality of the heating elements communicating heat to the cooking cavity of the rice cooker. Analog and mechanical, and other electronic means for switching and controlling the current communicated to heating elements are well known in the art and might also be employed. However, modern cooking devices that conventionally employ microprocessors to control the cooking cycle and temperatures are preferred as they are easily operatively engaged with a temperature sensor and may have onboard software to effectuate switching.

The microprocessor, upon receiving an electrical, thermal, or other signal from the temperature sensor, that a large temperature drop has occurred in a very short time duration, will thereafter act to lower the temperature in the cooking cavity. This is done by a signaling to a switching means to reduce the amount of electrical power communicated to the heating element. Or, it may be accomplished by opening a circuit to one or more heating elements, should a plurality be employed to heat the cooking cavity.

This lowering of temperature in the heating cavity for a longer term, second duration of cooking by simmering, thus takes no user switching or other action with regard to the cooking device. It takes no mental or positive action by the user to manually control and switch the cooker to the required lower temperature. A timer or other means to maintain the cooker in the simmering energized condition may thereafter be employed to allow the device to simmer or warm the mixture therein for a defined duration. Or an automatic switching means may be employed to switch the device to a warming mode after a simmering duration.

The means to sense a sudden reduction of temperature in the cooking cavity, caused by a user determining the high temperature phase is over, and adding liquid thereto, may be mechanical such as a thermally expanding and contracting spring engaged to an electrical contact for completing a circuit. Or, it may be electronic, using the noted temperature sensor to send a signal to the microprocessor to lower the electrical power and thereby lower the cavity temperature once a predetermined temperature drop is sensed. Those skilled in the art will ascertain upon reading this disclosure, that many means to sense the sudden temperature drop in the cooking cavity from a liquid being added in a short time period, and initiating an electronic signal or mechanical action, may be employed to move the device to its second and lower cooking cycle. As such all are considered within the scope of this invention.

Because the switching is accomplished with no conscious action by the user to control the cooker itself, a feedback device is also preferably provided for the user to view or hear and to calm any fears of the user that the temperature switch has not occurred. The feedback means will provide an audible and/or visual signal to the user, that the device has initiated a second cooking cycle, at the lower temperature, subsequent to their addition of liquid to the cooking cavity at the time of their choosing, thereby alleviating any concerns that it has not begun.

With respect to the above description then, it is to be realized that the dimensional and electronic relationships for the parts of the invention may also include variations in size, materials, shape, form, function and manner of operation, manner of formation, assembly and use, which are deemed readily apparent and obvious to one skilled in the art. Therefore, the foregoing summary and following description are considered as illustrative only of the principles of the invention to provide a slow cooker, a rice cooker, or similar countertop cooker which switches from a high temperature cycle to lower the temperature of the cooking cavity upon sensing the user has determined the higher cycle is over by adding liquid to the cooking cavity. Further, since numerous modifications and changes will readily occur to those skilled in the art, it is not desired to limit the invention to the exact construction and operation and steps of formation shown and described, and accordingly, all suitable modifications and equivalents may be resorted to, falling within the scope of the invention.

DETAILED DESCRIPTION OF THE INVENTION

Figure 1:
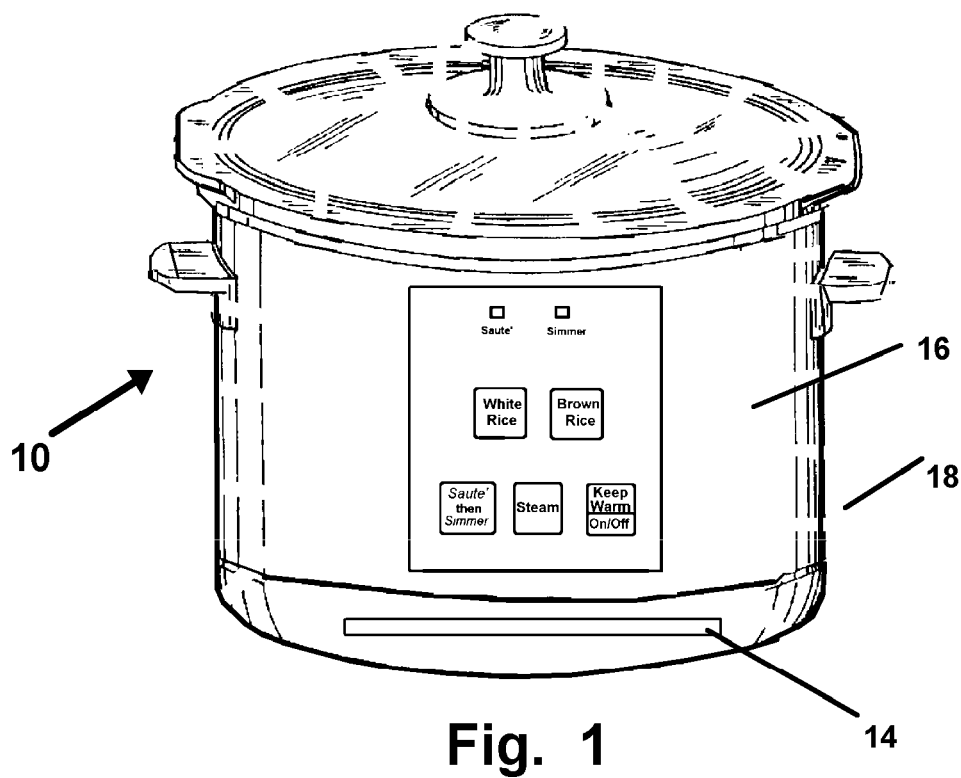
FIG. 1 depicts a view of a conventional cooker having the system herein and control panel with feedback indicia.

Referring now to the drawings in FIGS. 1-4, wherein similar parts of the invention are identified by like reference numerals, the device 10 is employed in combination with countertop cooking or slow cooker devices such as a rice cooker 18 as in FIG. 1. As graphically depicted in FIG. 2, the device 10 and method herein are configured to operate combined with a countertop style cooker such as a crock pot, or a rice cooker 18, and generally employ a microprocessor 12 which serves to control the heating temperature during cooking as provided by an electric heating element 14. Such heating elements are conventionally located below the cooking cavity 16 of cookers such as the depicted rice cooker 18, to provide heat to the cooker to raise it to an initial temperature level high enough for boiling the liquid contents to cook the rice, whereafter the temperature is reduced below the boiling point to allow the rice to simmer and cook for a long duration at low temperatures.

Figure 3:
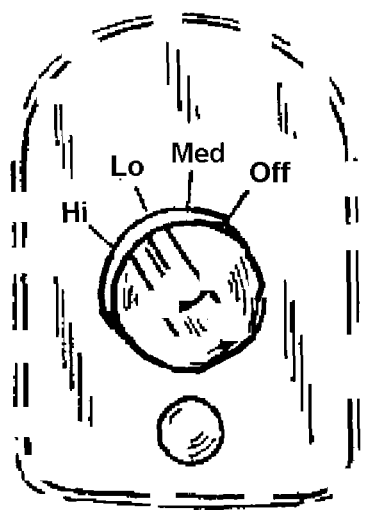
FIG. 3 depicts typical prior art wherein the user is required to manually change the device setting if a higher temperature is provided.

As noted, most such cookers do not provide the ability for users to initially cook food such as meat or fish, at higher temperatures prior to cooking another food at a lower temperature in order to provide a flavor stock to the subsequently added food. Instead, the user must cook the high-temperature cooked portion of the food elsewhere, and then add it to the cooking cavity 16 as the rice or other food is simmering therein. Cookers that do allow the user to cook at different and higher temperatures conventionally adjust manually. Thus, they require the user to remember and then to manually change the cooking temperature, by using a control as shown in FIG. 3. If forgotten, even after liquid is added, the food in the cooker will continue to cook at high sauteing temperatures after the fluid has been added, and ruin the food.

Employing the device 10 and method herein, a first phase of cooking at a higher initial temperature is provided upon energizing the cooker for stir frying, or sauteing food in the cooking cavity 16. This food from the first high temperature phase, is used to flavor the subsequently added rice or other food which is cooked at a lower temperature and simmers therein. During this first phase the heating element 14 raises the temperature in the cooking cavity 16 to a saute' or searing temperature in the range of between 140-160 degrees centigrade. This is conventionally hot enough for a high temperature phase which allows for searing, or sauteing the food within the cavity 16.

Once the user determines subjectively, that the duration of the food being cooked at the higher temperature is finished, and the food so cooked at high temperatures is ready to provide the flavor stock for the subsequently added rice or pasta or other simmer-cooked food added to the cooking cavity 16, a second phase temperature is initiated. This second phase is initiated by the user determining by sight, smell, taste, or other subjective means, that the variable time for the high temperature cooking phase is over, whereupon the user adds liquid to the cooking cavity 16. Along with the liquid may be rice, and of course other foods requiring similar cooking at lower temperatures, may be employed in the second phase lower temperature phase, and such is anticipated.

At this point in the process, once the user determines the end of the first phase by adding liquid to the cooking cavity 16, the second phase of cooking begins where liquid added to the cavity 16 and the formerly high temperatures in the cooking cavity 16 is lowered and remains in the second phase for the longer cooking of the rice at lower temperatures. Such cooking for rice or other added foods for low temperature cooking is conventionally substantially 100 degrees centigrade or in a range of 90-110 degrees centigrade.

The method and device 10 herein, provides a means to automatically reduce the temperature in the cooking cavity, without the user adjusting the device 10 or any temperature or other controls. Instead, the cooking temperature is reduced automatically when the user subjectively determines the first high temperature phase is complete by the act of the user adding liquid to the cooking cavity 16 which is normally done at the cessation of the first phase. Rather than requiring the user to manually take action to change the heat produced by the heating element 14, to lower the temperature in the cooking cavity 16, the device 10 and method herein employ a novel manner to automatically switch to the phase two cooking temperature and duration alleviating any error by the user forgetting to switch temperatures and which would cause the food to be burned or overcooked.

In providing for the user determined transition to phase two, a means to sense a sudden drop in the temperature in the cooking cavity 16, in the form of sensor 20 which is a heat-sensitive means for generating an electric or manual temperature signal corresponding to the temperature in the cooking cavity, is in communication with the cooking cavity 16 during the first and second cooking phases, and in operative electronic communication with the microprocessor 12 or other switching means capable of lowering the heat communicated to the cooking cavity 16. The end of the first phase of cooking, which can vary widely in duration depending on what is being cooked, is determined by the user by the adding a portion of liquid to the cooking cavity 16 for simmering and absorption of the rice or other food deposited therein with the liquid. This addition, of a volume of liquid to the cooking cavity 16, lowers the temperature in the cooking cavity 16 substantially immediately. Upon sensing the sudden drop in temperature in the cooking cavity 16, caused by the addition of liquid thereto by the user subjectively determining the end of the high temperature phase, the sensor 20 communicates an electronic signal to the microprocessor 12 which is adapted with software to cause a lowering of the temperature output of the heating element 14, to a level to produce heat in the cooking cavity 16 at the level for phase two, for simmering the liquid and additional rice or other food in the cavity for a duration of time to cook it. A timing element of the microprocessor 12 software or engaged thereto may also be included to limit the duration of the second phase of cooking and heating by the heating element 14 to heat the cooker 18.

In operation, as noted, the user having determined subjectively that the duration high temperature cooking such as sauteing food in the cavity 16 is over, will add liquid, such as water or broth thereto, for simmering of added food for the duration. The substantial and sudden drop in temperature caused by the addition of liquid to the cavity 16, will be ascertained by the sensor 20 which will communicate a signal the a controller capable of regulating the temperature of the heating element 14, such as a microprocessor 12, which will cause a lowering of the electrical current or supply to the heating element 14. This can be done with a separate controller or microprocessor-controlled switch 21 or using other means to throttle the electrical supply to the heating element 14. Thereafter, the temperature in the cavity 16 will be lowered to a predetermined lower temperature for a second cooking phase automatically by the control or microprocessor 12. A timer 13 may be employed to determine and to time, the duration of this second phase lower cooking temperature along with an automatic switching by the controller or microprocessor 12, to a third or warming phase to maintain the food in the device in a warm state.

Figure 2:
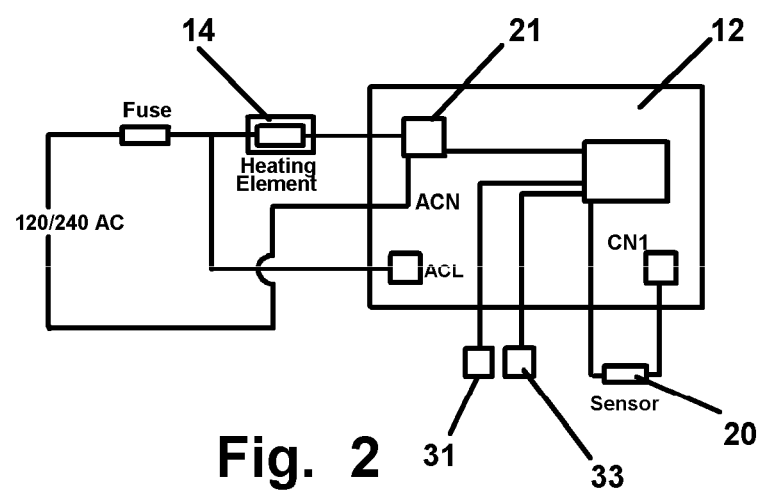
FIG. 2 depicts a graphical representation of the system herein wherein addition of liquid to the device, by a user determining the end of a duration of a higher heat mode, causes a sensible lowering of temperature.
Figure 4:
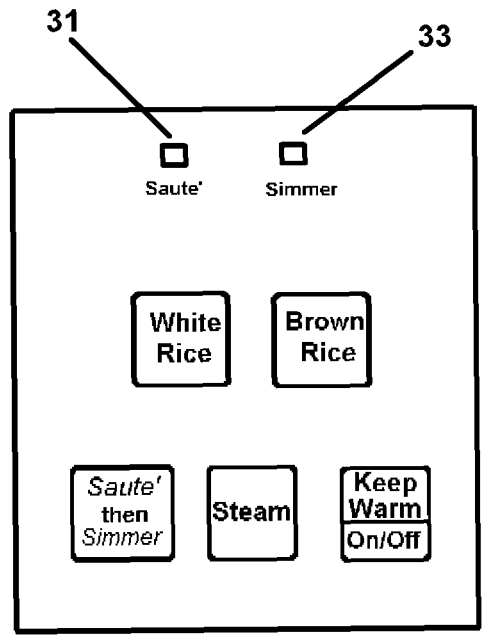
FIG. 4 depicts a control panel of the system herein showing the feed back indicia for a user in the form of LED's which illuminate when a lower temperature is automatically initiated.

Optionally but preferred, a means for feedback of the automatic temperature drop is provided to provide the user notice that phase two of cooking has begun. The device 10 as depicted in FIGS. 1, 2, and 4, provides LEDs which will illuminate during their respective phase one or phase two periods. Thus, once the saute or higher temperature period is determined by the user as finished, and phase two is started at lower temperatures, the first LED 31 adjacent to the term Saute will be darkened and the second LED 33 adjacent to the term Simmer will illuminate. Other means may be employed to provide the user feedback as to the phase of cooking.

As noted above, while the present invention has been described herein with reference to particular embodiments thereof and steps in the method of production, a latitude of modifications, various changes and substitutions are intended in the foregoing disclosures, it will be appreciated that in some instance some features or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A countertop cooking apparatus, comprising:
a housing having a heating element;
a cooking cavity receiving heat from said heating element;
said heating element having a high temperature cycle to communicate heat to said cooking cavity sufficient to saute or sear food therein;
said heating element having a low temperature cycle to communicate heat to said cooking cavity at a temperature sufficient only to simmer said food therein;
a controller operatively engaged with said heating element to switch said heating element between said high temperature cycle to said low temperature cycle;
heat-sensitive means for generating a temperature signal corresponding to the temperature of said cooking cavity to said controller;
said controller operative to control said heating element to maintain it in said high temperature cycle for an indeterminate amount of time;
said controller operative to substantially immediately switch said heating element from said high temperature cycle to said low temperature cycle, upon receipt of a said temperature signal, indicating a sudden drop in temperature in a short time duration, in said cooking cavity; and
said controller thereafter operative to control said heating element to maintain it in said low temperature cycle, whereby said food in said cooking cavity can be seared or sauteed during said high temperature cycle for an user subjectively ended time period, and said food is thereafter automatically simmered during said low temperature cycle.

2. The countertop cooking apparatus of claim 1, additionally comprising:
a timer operatively engaged to said heating element to maintain said heating element in said low temperature cycle for a user determined time period before switching to a third temperature cycle.

3. The countertop cooking apparatus of claim 2, additionally comprising:
said third temperature cycle being caused by said timer turning said heating element off.

4. The countertop cooking apparatus of claim 1, additionally comprising:
said high temperature cycle being between 135 and 165 degrees centigrade; and
said low temperature cycle being between 85 and 105 degrees centigrade.

5. The countertop cooking apparatus of claim 2, additionally comprising:
said high temperature cycle being between 135 and 165 degrees centigrade; and
said low temperature cycle being between 85 and 105 degrees centigrade.

6. The countertop cooking apparatus of claim 3, additionally comprising:
said high temperature cycle being between 135 and 165 degrees centigrade; and
said low temperature cycle being between 85 and 105 degrees centigrade.

7. The countertop cooking apparatus of claim 1, additionally comprising:
said a sudden drop in temperature in a short time duration being caused by an addition of liquid or food to said cooking cavity; and
said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

8. The countertop cooking apparatus of claim 2, additionally comprising:
said a sudden drop in temperature in a short time duration being caused by an addition of liquid or food to said cooking cavity; and
said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

9. The countertop cooking apparatus of claim 3, additionally comprising:
said a sudden drop in temperature in a short time duration being caused by an addition of liquid or food to said cooking cavity; and
said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

10. The countertop cooking apparatus of claim 4, additionally comprising:
said a sudden drop in temperature in a short time duration being caused by an addition of liquid or food to said cooking cavity; and
said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

11. The countertop cooking apparatus of claim 5, additionally comprising:
said a sudden drop in temperature in a short time duration being caused by an addition of liquid or food to said cooking cavity; and
said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

12. The countertop cooking apparatus of claim 6, additionally comprising:
   said a sudden drop in temperature in a short time duration being caused by an addition of liquid or food to said cooking cavity; and
   said controller operative to determined said short period of time at a length between 1 and 20 seconds, whereby a user subjectively determining said high temperature cycle is finished, by adding liquid or food to said cooking cavity, initiates said sudden drop in temperature effectuating said change to said low temperature cycle.

13. The countertop cooking apparatus of claim 2, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

14. The countertop cooking apparatus of claim 5, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

15. The countertop cooking apparatus of claim 6, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

16. The countertop cooking apparatus of claim 8, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

17. The countertop cooking apparatus of claim 9, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

18. The countertop cooking apparatus of claim 12, additionally comprising:
   said timer configured to communicate to said controller a cessation signal of said second cycle after a predetermined time duration; and
   said cessation signal to said controller to causing said element to heat said cooking cavity at a third temperature cycle at a warming temperature less than 100 degrees centigrade to warm said food but prevent boiling.

\* \* \* \* \*